Patented Sept. 22, 1953

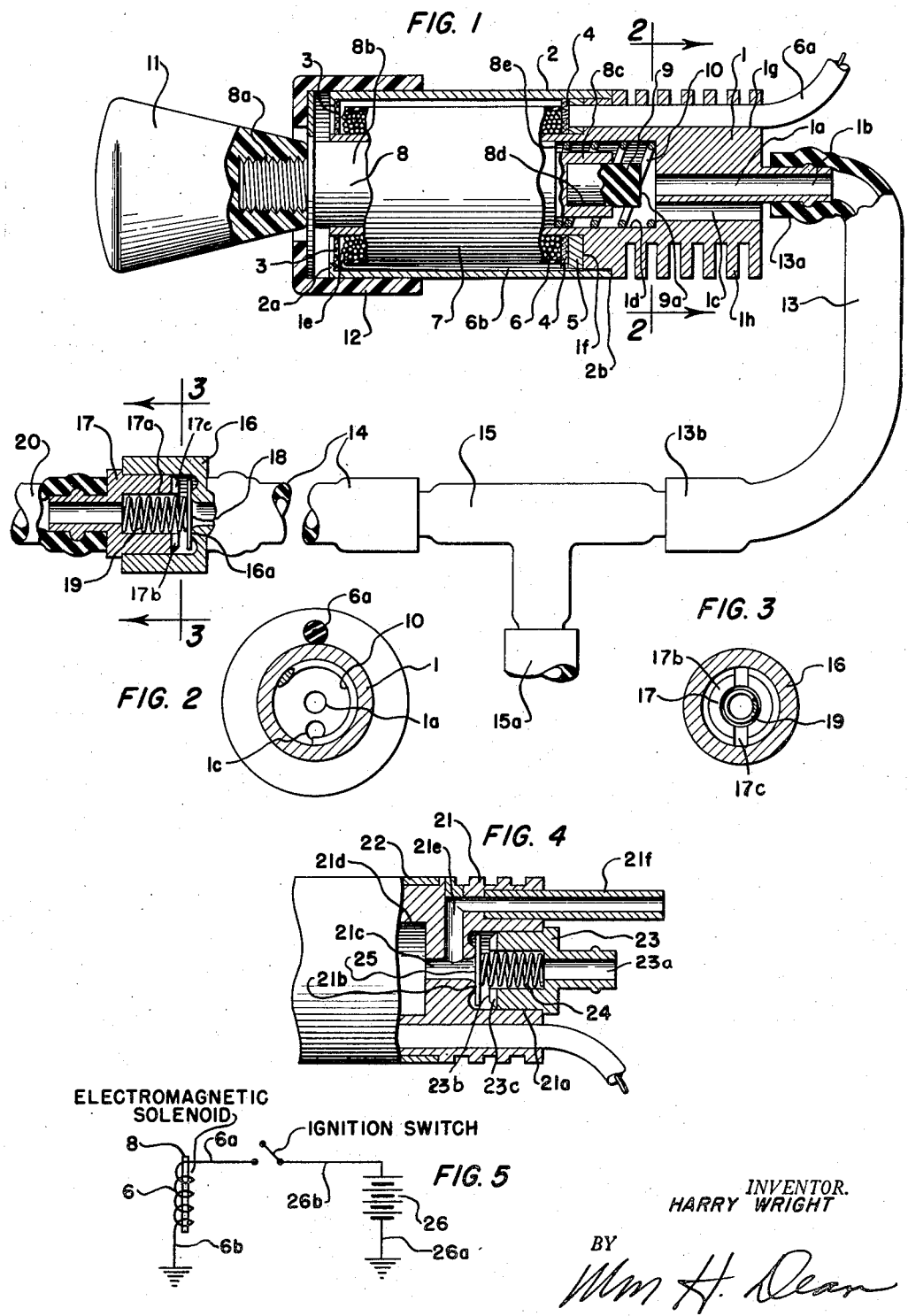

2,652,855

UNITED STATES PATENT OFFICE 2,652,855

COMBINATION VACUUM AND SOLENOID OPERATED VALVE

Harry Wright, San Diego, Calif., assignor to Accurate Tool and Engineering Company, San Diego, Calif., a copartnership Application May 16, 1949, Serial No. 93,477

3 Claims. (Cl. 137—614.19)

My invention relates to a combination vacuum and solenoid operated valve, more particularly for use in connection with vacuumatic automobile door locks, and the objects of my invention are:

First, to provide a valve of this class in which a solenoid in electrical series circuit with the ignition switch of an automobile engine, controls a vacuumatic automobile door lock, whereby the vacuum in the door lock is automatically released when said ignition switch is opened, de-energizing said solenoid, which permits a spring to open the valve plunger normally held closed by the force of the solenoid;

Second, to provide a valve of this class which instantly and automatically relieves vacuum in vacuumatic automobile door locks when the ignition switch of the automobile is turned off, permitting the doors to be opened without manual operation of any door lock vacuum releasing devices;

Third, to provide a valve of this class having a combination solenoid and vacuum operated valve means, in which the solenoid valve means is arranged in series with the vacuum operated valve means, whereby a drop in automobile engine intake vacuum causes the vacuum controlled valve mechanism to close and maintain a certain predetermined vacuum existent at the closing portions of the solenoid valve, and communicating with the vacuumatic lock in connection therewith;

Fourth, to provide a novel combined solenoid and electromagnetic means;

Fifth, to provide a novel solenoid valve;

Sixth, to provide a valve of this class which does not disturb the normal opening and closing operations of the automobile doors when the engine of the automobile is not operating;

Seventh, to provide a valve of this class which may be very simply and easily operated to permit the opening of automobile doors having vacuumatic locks in connection therewith when the engine of the automobile is operating; and Eighth, to provide a valve of this class which is very simple and economical of construction in proportion to its utility, and which is efficient in action, and which will not readily deteriorate or get out of order.

With these and other objects in view, as will appear hereinafter, my invention consists of certain novel features of construction, combination and arrangement of parts and portions, and a certain modification, as will be hereinafter described in detail and particularly set forth in the appended claims, reference being had to the accompanying drawings and to the characters of reference thereon, which form a part of this application, in which:

Fig. 1 is an enlarged fragmentary longitudinal sectional view of my valve, showing parts and portions thereof in elevation to facilitate the illustration; Fig. 2 is a transverse sectional view taken from the line 2—2 of Fig. 1; Fig. 3 is a transverse sectional view taken from the line 3—3 of Fig. 1; Fig. 4 is a fragmentary longitudinal sectional view of a modified form of my valve, illustrated on a common plane to that as shown in Fig. 1 of the drawings, and showing a portion in elevation; and Fig. 5 is a diagrammatic view of the wiring in connection with the electrical equipment of my valve.

Similar characters of reference refer to similar parts and portions throughout the several views of the drawing.

The casing 1, sleeve 2, insulation washers 3 and 4, magnetic washer 5, solenoid winding 6, winding cover 7, valve plunger 8, valve gasket 9, spring 10, plunger knob 11, casing cap 12, tubes 13 and 14, tube connector 15, check valve casing members 16 and 17, disc 18, spring 19, and the manifold vacuum conductor 20 constitute the principal parts and portions of my valve.

The casing 1 forms the main body of my valve, which is preferably made of non-magnetic lightweight metal, such as aluminum or the equivalent thereof. This casing 1 is provided with a vacuum conducting bore portion 1a, substantially centrally thereof, as shown in Fig. 1 of the drawings, which terminates in a tubular portion 1b on the outer side of which the end 13a of the tube 13 is engaged in air-tight connection therewith. Adjacent the bore 1a is the bore 1c, communicating with the enlarged plunger bore 1d, with which the bore 1a also communicates, all as shown in Fig. 1 of the drawings. Surrounding the bore 1d is an extended thin-walled cylindrical portion 1e of the casing 1, in which the valve plunger 8 is reciprocally mounted. The casing 1 is provided with a shoulder portion 1f at the normally inner end of the cylindrical portion 1e surrounding the bore 1d, adjacent to which the magnetic washer 5 is positioned. This magnetic washer 5 may be made of steel or other suitable material, and is contiguous to the insulation washer 4, adjacent one end of the solenoid winding 6, which is surrounded by the winding cover 7, preferably made of insulation material, all as shown in Fig. 1 of the drawing.

It will be noted that the solenoid winding 6 surrounds the thin-walled cylindrical portion concentrically surrounding the bore portion 1d in which the valve plunger 8 is reciprocally mounted. This valve plunger 8 is preferably made of magnetic material, such as iron or steel, as desired. Adjacent the opposite end of the solenoid winding 6 is the insulation washer 3, which is abutted to an inwardly-directed flange portion 2a of the sleeve 2, which is a hollow cylindrical member preferably made of magnetic material, such as steel or iron. The opposite end 2b of the sleeve 2 from the inwardly directed flange 2a is positioned in surrounding relationship with a portion of the casing 1 adjacent the shoulder 1f, and the sleeve 2, at its end 2b, is preferably pressed on the casing 1 in friction-tight relationship therewith. The solenoid winding 6 is provided with an extending conductor 6a, which is directed from the solenoid winding 6 through the bore portion 1g of the casing 1, all as shown best in Fig. 1 of the drawings.

The opposite end of the solenoid winding 6, at its conductor portion 6b, is electrically connected to the sleeve 2 and the casing 1 by interposing the same between the casing 1 and the sleeve 2 when pressing the sleeve 2 on said annular portion of the casing 1. The casing 1 electrically grounded to the structure of the automobile body, providing an electrical connection for the end 6b of the solenoid winding 6. The electrical conductor 6a is connected to the ignition switch of the automobile engine, as identified by the legend in Fig. 5 of the drawings. The outer end of the valve plunger 8 is provided with a screw-threaded portion 8a on which the manual control knob 11 is connected. The body portion 8b of this plunger 8 is slidably fitted in the bore 1d of the casing 1, with fairly liberal operating tolerance.

The end 8c of the valve plunger 8 is provided with a socket portion 8d in which the valve gasket member 9 is positioned. This valve gasket member 9 is preferably made of heat-and-oil-resistant synthetic rubber or the like, or may be made of any other suitable material, as desired. It is to be noted that the character of the material employed in the valve gasket member 9 must be yieldable to a certain extent, and the diameter thereof must be substantially larger than the bore 1a, so that the end portion 9a of the valve gasket member 9 will conform to the surface of the casing 1 at the end of the bore 1d and the bore portion 1a for sealing the vacuum in said bore portion 1a and the tube communicating therewith.

The spring 10 surrounds the end portion 8c of the plunger 8, which is substantially reduced in diameter, providing a shoulder 8e which serves as a bearing for the one end of the spring 10, the opposite end of which is abutted at the end of the bore portion 1d in the casing 1, all as shown best in Fig. 1 of the drawings. It will be here noted that the casing 1 is provided with external cooling fins 1h, which are optional, but which may be employed to transfer heat from the solenoid winding 6, if desired. The particular solenoid winding 6 does not however, create an objectionable or dangerous rise in temperature of any of the parts of the valve.

The tube 13 is a hollow flexible tube, preferably made of rubber or the like, and its end portion 13b communicates directly with the tube connector 15, which is a hollow T-shaped transition conductor intercommunicating with the tubes 14 and 15a, as shown in Fig. 1 of the drawings. The tube 14 communicates with the check valve casing 16, having a valve seat 16a therein, adjacent to which the disc 18 is positioned, and which is maintained in contiguous relationship therewith by means of the spring 19, which is a hollow coil spring abutted in the bore portion 17a, at its one end, in the check valve casing member 17, which communicates with the manifold vacuum conductor 20, which extends to and is connected with a fitting communicating with the interior of the internal combustion engine intake manifold. It will be here noted that the check valve casing 17 is provided with an abutment 17b, having a diametrical vent 17c, which prevents double seating of the disc 18. The tube 15a extends directly to a vacuumatic door lock, not shown in the drawings, and which is no part of my present invention, but which is a conventional device, wherein vacuum causes extension of locking plungers which interengage the door and door frame structures of automobile bodies. In operation the check valve disc 18 automatically prevents vacuum from being relieved through the tube 14 from the door locks through the tube 15 when vacuum pressure rises in the engine manifold communicating with the tube 20. The solenoid valve plunger 9a may be manually unseated by pulling the knob 11 in opposition to the solenoid thrust for relieving vacuum from the vacuumatic locks through the tubes 13b and 15a during the operation of the intake manifold connected with the tube 20. It will be here noted that the vacuumatic door locks are of a conventional type, in which vacuum extends the bolts thereof and a spring retracts the same when vacuum is relieved.

In the modification as shown in Fig. 4 of the drawings, the casing 21 is similar to the casing 1, and is provided with an enlarged bore portion 21a in which the check valve casing 23 is secured, wherein the spring 24 forces the disc 25 against the valve seat 21b, which communicates with the bore portions 21c and 21d, which correspond to the bore portions 1a and 1d of the structure hereinbefore described. Communicating with the bore 21c is a third bore 21e, having an extension tube 21f which communicates with the automobile door locking cylinder hereinbefore described. The tube 23a communicates with the intake manifold of an internal combustion engine and corresponds in opeation to the connection for the tube 20 in structure and operation. The vent to atmosphere in the structure of Fig. 4 is similar to the vent 1c shown in Fig. 1, and is disposed at a plane 90 degrees to the sectional plane of Fig. 4. In the check valve casing 23, an abutment 23b is provided with a diametrical vent slot 23c, adapted to prevent double seating of the valve disc 25. Thus, the modification as shown in Fig. 4 of the drawings incorporates the check valve in the main valve casing, which is adapted to receive and maintain the operation of a valve plunger and valve gasket member similar to the plunger 8 and the gasket member 9, as shown in and described in connection with Fig. 1 of the drawings.

In the diagrammatic view of the wiring, as shown in Fig. 5 of the drawings, the automobile battery 26 is grounded by a conductor 26a, and the conductor 26b extends to the automobile ignition switch, as identified by the legend in Fig. 5 of the drawings. The conductor 6a, as hereinbefore described in connection wth Fig.

1 of the drawings, is connected in series with the ignition switch, and the conductor 6b, in connection with the solenoid winding 6, as described in connection with Fig. 1 of the drawings, is grounded to common structure, completing a circuit which is controlled by the opening and closing of the automobile ignition switch.

Though I have shown and described a particular construction, combination and arrangement of parts and portions, and a certain modification, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a valve for controlling vacuum communicating with vacuumatic door locks, a casing, having a vacuum passage therein a source of vacuum communicating therewith, a valve seat at the terminus of said passage inwardly of said casing, a bore having one end communicating with said casing inwardly of said valve seat and the other end communicating with atmospheric air, a plunger reciprocally mounted relative to said valve seat, a solenoid winding connected with said casing when electrically energized tending to urge said plunger toward said seat, a spring forcing said plunger away from said seat when said solenoid winding is de-energized a check valve communicating with said vacuum passage and arranged to prevent air from passing into said passage toward the seat at the terminus thereof, and an outwardly extending manual control knob connected to said plunger.

2. In a valve for controlling vacuum communicating with vacuumatic door locks, a casing, having a vacuum passage therein a source of vacuum communicating therewith, a valve seat at the terminus of said passage inwardly of said casing, a bore having one end communicating with said casing inwardly of said valve seat and the other end communicating with atmospheric air, a plunger reciprocally mounted relative to said valve seat, a solenoid winding connected with said casing when electrically energized tending to urge said plunger toward said seat, a spring forcing said plunger away from said seat when said solenoid winding is de-energized a check valve communicating with said vacuum passage and arranged to prevent air from passing into said passage toward the seat at the terminus thereof, said plunger having a soft conforming portion adapted to engage said seat portion, and an outwardly extending manual control knob connected to said plunger.

3. In a valve for controlling vacuum communicating with vacuumatic door locks, a casing, having a vacuum passage therein a source of vacuum communicating therewith, a valve seat at the terminus of said passage inwardly of said casing, a plunger reciprocally mounted relative to said valve seat, a solenoid winding connected with said casing when electrically energized tending to urge said plunger toward said seat, a spring forcing said plunger away from said seat when said solenoid winding is de-energized a check valve communicating with said vacuum passage and arranged to prevent air from passing into said passage toward the seat at the terminus thereof, said plunger having a soft conforming portion adapted to engage said seat portion, said plunger having a diametrically extending magnetically responsive portion near the end of said solenoid winding, and a magnetically responsive sleeve surrounding said solenoid winding, arranged to magnetically attract said diametrically extending magnetically responsive portion when said solenoid winding is electrically energized, said plunger having a manual control knob on the end thereof opposite said soft conforming portion, permitting the opening of said valve seat portion when said solenoid winding is electrically energized.

HARRY WRIGHT.

References Cited in the file of this patent

UNITED STATES PATENTS

| Number | Name | Date |
|---|---|---|
| 1,049,845 | Geissinger | Jan. 7, 1913 |
| 1,296,735 | Arbuchle | Mar. 11, 1919 |
| 1,389,056 | Lane | Aug. 30, 1921 |
| 2,279,243 | Parsons | Apr. 7, 1942 |
| 2,297,076 | Sachs | Sept. 29, 1942 |
| 2,344,826 | Gresley | Mar. 21, 1944 |
| 2,391,129 | Chambers | Dec. 18, 1945 |
| 2,472,544 | Nissen | June 7, 1949 |